Dec. 31, 1940.   A. H. CHAMBERLAIN   2,226,921
PISTON RING
Filed Aug. 16, 1938
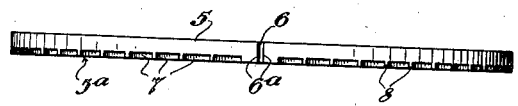
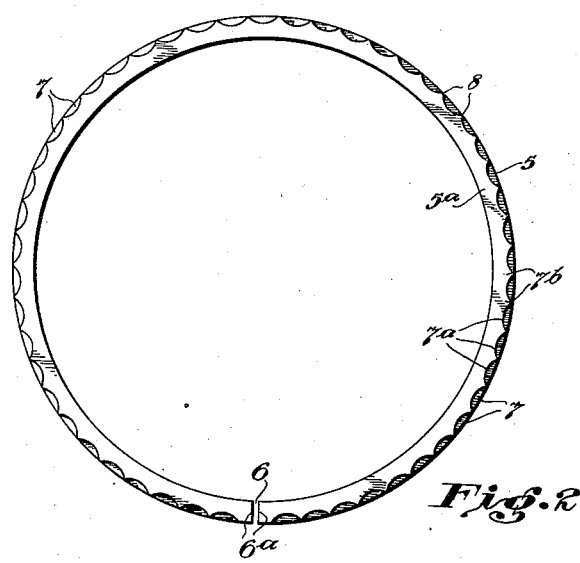
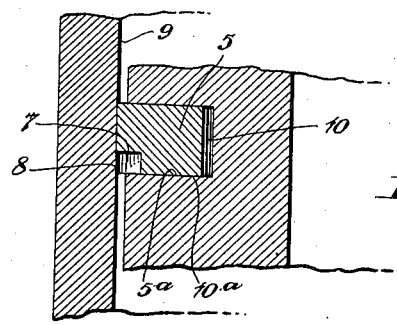
Alan Hawker Chamberlain
INVENTOR Patented Dec. 31, 1940

2,226,921

UNITED STATES PATENT OFFICE 2,226,921

PISTON RING

Alan Hawker Chamberlain, Melbourne, Victoria, Australia

Application August 16, 1938, Serial No. 225,174
In Australia August 19, 1937

1 Claim. (Cl. 309—45)

This invention relates to rings for pistons and more particularly to rings which are usable as compression rings for the pistons of high speed internal combustion engines.

In many cases the external periphery of a piston ring, particularly when it is new, does not accurately fit the wall of the cylinder with which it co-acts and lubricating oil escapes through a clearance or clearances between the ring and the cylinder wall. The loss of oil at normal speed may not be excessive but at higher speeds the loss becomes much greater and as modern automobile engines are designed to operate at high speed, excessive consumption of lubricating oil due to losses in the manner referred to, considerably increases running costs.

One known piston ring of scraper type has a shallow groove or channel at the outer corner that is nearer the engine crank case (hereinafter called the lower outer corner), in which oil is collected. Pressure on the oil in the groove or channel forces such oil through any clearance between the outer peripheral face of the ring and the cylinder wall and at high speed the pressure may be sufficient to cause oil for a considerable distance at each side of any clearance to flow along the groove or channel and escape through such clearance. It has been proposed to close the ends of the oil groove or channel to prevent the escape of oil from the said groove or channel through the gap between the ends of the ring but such an arrangement does not reduce the leakage through any other clearance.

The outer face of a ring which has a groove or channel at the lower outer corner, is narrower than the depth of the ring by the height of the said groove or channel and this allows the ring to cant or twist so that only that part of the outer face which is adjacent to the said groove or channel contacts with the cylinder wall. It has been claimed that this action is advantageous but many experts are of opinion that twisting or canting of the ring is detrimental and that it increases the liability to gas "blowby."

One object of this invention is to provide an inexpensive and durable piston ring which will minimize the loss of oil due to leakage between the external periphery of the ring and the wall of a cylinder in which it is operating.

Another object of this invention is to provide a piston ring which will function as a scraper ring, which provides bearing faces of greater area than channelled rings while retaining all the advantages of such rings, and the torsional rigidity of which is such that it resists canting or twisting to such an extent that "blowby" of gas is prevented or minimized.

Another object of this invention is to provide a piston ring which has the advantages of a channelled ring but which presents a greater bearing surface to the groove lower face than a channelled ring and so prevents uneven wear on that face.

A further object of this invention is to provide a piston ring which will efficiently control the distribution of oil.

A piston ring according to this invention is formed with a plurality of relatively short recesses in the lower face thereof, i. e. the face nearest the crank case, each of said recesses extending inwardly from the outer periphery of the ring, each wall or partition between contiguous recesses extending the full depth of the said recesses, the latter being arranged so that the outer end of each of said walls or partitions is relatively thin. Loss of oil through any clearance between the outer face of the ring and a cylinder wall is restricted to the recess in registry with such clearance.

But in order that this invention may be more readily understood a practical embodiment thereof will now be described with reference to the accompanying drawing in which:

Fig. 1 is a side elevation of a piston ring according to my invention.

Fig. 2 is an inverted plan of the piston ring shown in Fig. 1.

Fig. 3 is a diagrammatic detail vertical section showing a ring according to my invention arranged relatively to a piston in a cylinder.

5 is a ring of substantially rectangular cross section which is split at 6, the ends 6ª being butted as shown or scarfed in known manner.

A series of short shallow recesses 7 are formed in the outer edge of the lower face 5ª of the ring 5, the contiguous recesses being divided by narrow walls 8 which preferably extend the full depth of the outer face of the ring to constitute part of the total bearing face which contacts with the wall 9 of a cylinder in which the ring operates.

The recesses 7 have an arcuate wall as 7ª and they are separated by bearing faces 7ᵇ which extend to the outer periphery of the ring and which constitute part of the bearing face that contacts with the lower face 10ª of the groove 10 in which the ring is arranged.

It is well known that piston rings oscillate circumferentially relatively to the groove 10 in which they are fitted, to such an extent that they wear a track in the face 10ᵃ, and it is a feature of this invention that if the ring does wear a track in the face 10ᵃ that track is of regular depth and width throughout the circumference of the ring.

It will be apparent that if there is any clearance between the cylinder wall and a piston ring having recesses in its lower outer corner according to this invention, the escape of oil will be localized to the recess or recesses in registry with such clearance.

I claim:

A piston ring of substantially rectangular cross section formed with a plurality of relatively short shallow recesses in the face to be arranged nearer the crank case, each of said recesses extending inwardly from the outer periphery of the ring and being bounded by an arcuate wall, the wall between adjacent recesses being continuous with the arc and being relatively thin at the said outer periphery and increasing in thickness radially from the said outer periphery toward the inner face of the ring.

ALAN HAWKER CHAMBERLAIN.